Dec. 2, 1930. L. S. WILBUR 1,783,353
SPLICE BAR OR FISH PLATE
Filed June 28, 1929
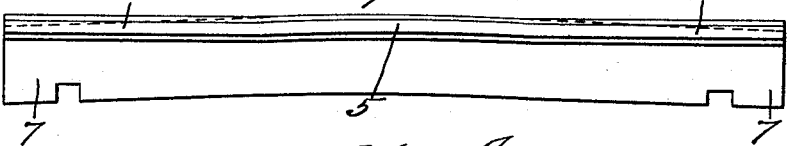
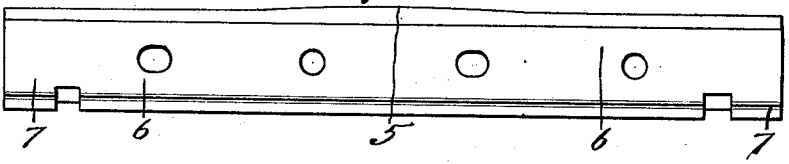
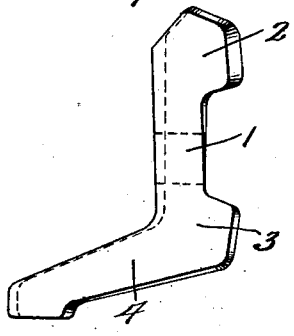
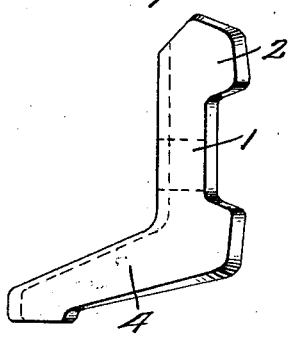
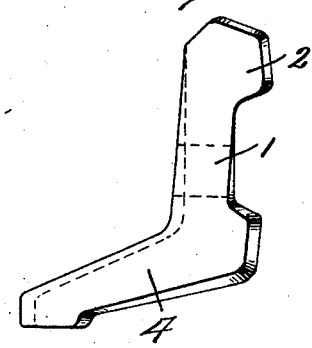
Inventor:
Lawrence S. Wilbur
By Arthur F. Durand
Atty.

Patented Dec. 2, 1930

1,783,353

UNITED STATES PATENT OFFICE

LAWRENCE S. WILBUR, OF EVANSTON, ILLINOIS

SPLICE BAR OR FISHPLATE

Application filed June 28, 1929. Serial No. 374,369.

This invention relates to splice bars or fish plates for use on rail joints, and it relates more particularly to splice bars or fish plates for use on old rails, or rails which have become worn and distorted by use, and to the method of production thereof.

Generally stated, the object of the invention is to provide a splice bar or fish plate having a middle portion which is curved or bulged inwardly, in combination with straight end portions disposed at an angle to each other, said middle portion being humped or crowned, whereby the bar is of greater fishing height at its middle than at the ends thereof, thereby to enable the bar or fish plate to properly engage the sides of worn and distorted rails.

It is also an object to provide certain details and features of construction and method steps tending to increase the efficiency and desirability of a splice bar or fish plate of this particular character.

To the foregoing and other useful ends, the invention consists in the matters hereinafter set forth and claimed, and shown in the accompanying drawings, in which,—

Fig. 1 is a plan view of a splice bar or fish plate embodying the principles of the invention.

Fig. 2 is a similar view, showing a different form of the invention.

Fig. 3 is a similar view, showng a different form of the invention.

Fig. 4 is a side elevation of one of said bars.

Fig. 5 is an end view of the bar shown in Fig. 1 of the drawings.

Fig. 6 is an end view of the bar shown in Fig. 2 of the drawings.

Fig. 7 is an end view of the bar shown in Fig. 3 of the drawings.

As thus illustrated, and referring to Figs. 1, 4 and 5, it will be seen that the splice bar or fish plate comprises an upright web portion 1 provided with a top or head 2 and with a heel 3 forming the foot of the bar. The flange 4 is integral with said heel and extends downwardly and outwardly as shown. The middle portion 5 of the bar is curved or bulged inwardly, as shown, from top to bottom of the bar. The straight end portions 6 of the top or head of the bar are disposed at an angle to each other, so that they extend away from the sides of the rails at the end of the bar. The end portions 7 of the flange and heel are perfectly straight and in exact alignment with each other, whereby only the top portions 6 of the bar form straight end portions disposed at an angle to each other, with the curved or inwardly bulged portion between them. The said middle portion 5 is humped or crowned, as shown in Fig. 4 of the drawings, whereby the bar is of non-uniform fishing height.

In Fig. 2 of the drawings, it will be seen that the curved or bulged middle portion 5 is the same as that previously described, but in this case the end portions of the bar are straight and disposed at an angle to each other, throughout the entire height of the bar, whereby the bottom flange and heel of the bar extend away from the sides of the rails, as well as the top or head of the bar. This is indicated in Fig. 6 of the drawings.

In Fig. 3 of the drawings, and as indicated in Fig. 7 of the drawings, the middle portion 5 of the bar is similar to that previously described, but in this case the end portions 6 of the top or head of the bar are straight and in exact alignment with each other, whereas the end portions 7 of the bottom flange and heel are straight and disposed at an angle to each other, whereby the lower portion of the bar extends away from the sides of the rails, at the ends of the bar, while the top or head of the bar does not do this.

In each form of the invention, the middle portion 5 is humped or crowned as shown, whereby in each form of the invention the middle portion of the bar is of greater fishing height than the ends of the bar.

The bars or fish plates can be new bars, or they can be old bars reshaped or reformed in the desired manner. If bars embodying the invention, of which the bars shown in the drawings are examples, are made from old bars, the fishing height of the bar may be increased to some extent in the reforming or reshaping of the bar, as by reducing the thickness of the web of the bar. In this way the reshaped or reformed bar will be of somewhat greater fishing height, throughout its length, than the original bar from which it was made. The rails become worn and distorted by use, more especially at and adjacent the ends of the rails, but there is some wear on the rails throughout the length of the splice bars or fish plates. Hence, for use on old rails, it is sometimes desirable to have the fishing height of the bars increased, to compensate for the wear on the rails, and this may be true even with new bars, for new bars can be made of greater fishing height than the bars which were originally on the joint.

In each form of the invention there are two straight end portions disposed at an angle to each other, with an inwardly curved or bulged middle portion between said end portions, this middle portion being humped or crowned; and said straight end portions may be merely the top or head of the bar, as in Figs. 1 and 5, or such straight end portions may comprise both the top and bottom of the bar, as shown in Figs. 2 and 6, or such straight end portions may comprise only the bottom and heel of the bar, as shown in Figs. 3 and 7 of the drawings. If the ends of the bar, in each form of the invention, are drawn or sprung in, when the bolts are tightened, obviously, the middle portion of the bar will tend to spring inwardly to take up wear.

It will be seen that the different bars or the different forms of the invention can be used in combination with each other, in the same unitary structure, as by using one form of bar on one side of the rail joint, and another form on the other side. Also, the different kinds of bars can be used on successive rail joints in the same general rail structure, whereby they will all co-operate with each other to maintain the continuity of the rails. Thus all the bars may form part of the same structure and co-operate with each other to maintain the rails in proper condition.

What I claim as my invention is:

1. A splice bar or fish plate for rail joints, comprising an inwardly bulged or curved middle portion disposed between end portions which are straight and disposed at an angle to each other, said middle portion being humped or crowned, whereby the bar is of greater fishing height at its middle than at the ends thereof, whereby said end portions extend away from the rails.

2. A structure as specified in claim 1, said end portions comprising only the top or head of the bar, whereby the bottom portions of the bar at each side of said middle portion are straight and in exact alignment with each other.

3. A structure as specified in claim 1, said end portions comprising both the top and bottom of the bar.

4. A structure as specified in claim 1, said end portions comprising only the bottom portions of the bar at each side of said middle portion, whereby the top portions of the bar at each side of said middle portion are straight and in exact alignment with each other.

5. A structure as specified in claim 1, said bar or fish plate being an old bar or fish plate reshaped or reformed.

6. A structure as specified in claim 1, said bar or fish plate being an old bar or fish plate reshaped or reformed, the reforming causing an increase in the fishing height of the bar, throughout the length thereof, whereby such height is greater than that of the old bar.

Specification signed this 25th day of June, 1929.

LAWRENCE S. WILBUR.